Aug. 6, 1940.　　　　S. J. MORRISSEY　　　　2,210,093
MATERIAL HANDLING DEVICE
Filed May 12, 1938
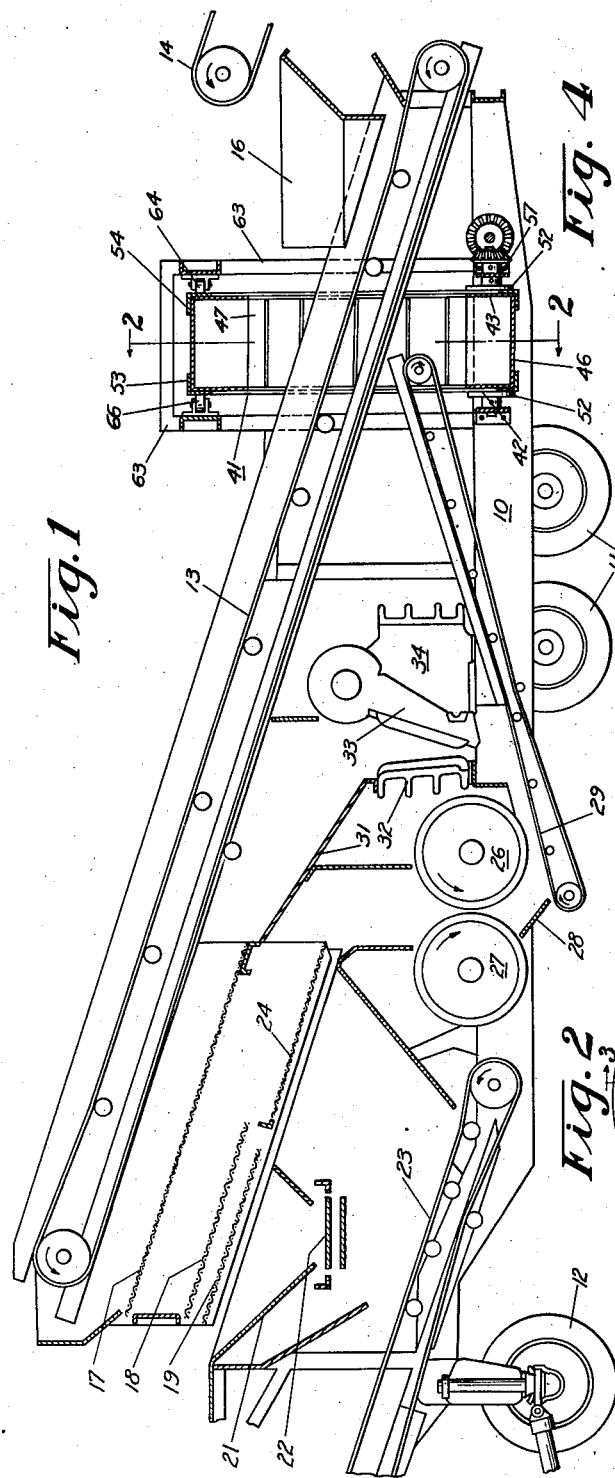
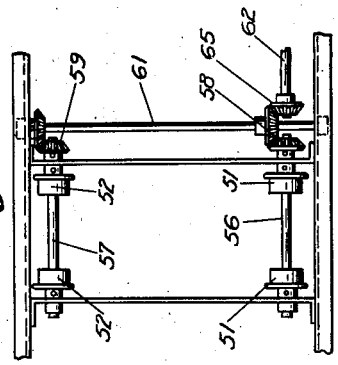
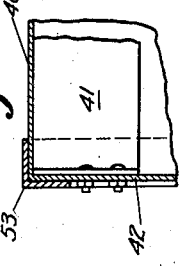
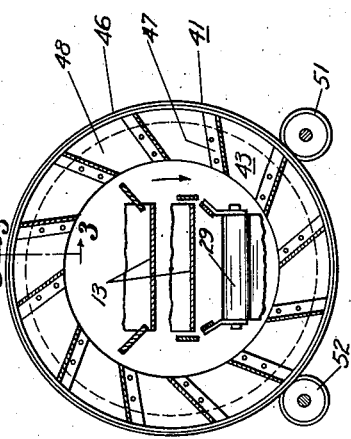
INVENTOR.
STEPHEN J. MORRISSEY
BY Flournoy Covey
ATTORNEY.

Patented Aug. 6, 1940

2,210,093

UNITED STATES PATENT OFFICE

2,210,093

MATERIAL HANDLING DEVICE

Stephen J. Morrissey, Rapid City, S. Dak., assignor, by mesne assignments, to Diamond Iron Works, Incorporated, a corporation of Delaware Application May 12, 1938, Serial No. 207,528

1 Claim. (Cl. 83—53)

This invention relates to material handling apparatus and more particularly to a conveyor means suitable for transferring material from one conveyor to another, as in rock crushers and the like.

In order to secure large production in rock crusher systems and other devices of this character, the machines become very heavy and cumbersome and even the portable crushers are difficult to move from one point to another. In addition, these machines are relatively complicated and employ a large number of parts.

A general object of my invention is to simplify rock crushing machinery and conveyor systems.

Another object of my invention is to provide means for securing a more compact organization of the parts of rock crushers and the like and of conveyor machinery in general.

Another general object of my invention is to provide means for readily transferring material from one conveyor to another.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claim, without departing from the spirit of the invention.

In said drawing:

Figure 1 is a more or less schematic diagram of a rock crusher embodying my invention but showing parts of the device in detail and in section.

Figure 2 is a vertical section of the rotary drum mechanism taken on the line 2—2 of Figure 1.

Figure 3 is a fragmentary view in section taken on the line 3—3 of Figure 2, and Figure 4 is a fragmentary plan view of the means for supporting and driving the rotary drum mechanism.

Referring now to the drawing:

Referring now more particularly to Figure 1, the main frame of a rock crusher of usual construction, except as to the addition of a device constructed according to my invention, is indicated at 10. This main frame is supported on dual wheels 11 and front wheels 12. In devices of this character it is the general practice to provide an endless belt conveyor 13 running the length of the machine in the direction indicated by the arrows. This belt conveyor is adapted to receive material from the loading conveyor 14 and hopper 16 and carry it up the conveyor to the front of the machine where it is deposited on a vibrating screen 17.

The lighter, finer screenings drop down to the screens 18 and 19 into the hopper 21 and are carried out by the belt 22. The screens 17, 18 and 19 are of increasing fineness and material which will pass through the screen 18, but is not of such fineness as to pass through the screen 19, travels downwardly over the screen 19 and falls onto the delivery conveyor 23. Material which will pass through the screen 17, but will not pass through the screen 18, travels downwardly over the screen 18 and over second screen 24 to drop between the roll crushers 26 and 27. After passing through the roll crushers 26 and 27 the material falls onto the hopper 28 and is then directed onto the belt conveyor 29.

Material which is too coarse to pass through the coarse screen 17 moves downwardly over this screen and over the baffle 31 and in between the stationary jaw 32 and movable jaw 33 of the crusher 34. After this material has been crushed it also drops down onto the conveyor belt 29 and is carried upwardly and rearwardly by this belt. The material discharged from this belt falls on the inside of the drum conveyor 41.

The drum conveyor has annular sides 42 and 43 and peripheral band 46 and is preferably provided with blades or paddles 47. These paddles 47 are preferably inclined or nonradial so as to form pockets 48 to hold and carry the material discharged from the conveyor belt 29. It may readily be understood that material received in the pockets 48 will be carried to a position near the top of the drum as the drum is rotated, and will be discharged onto the upper level of the conveyor 13 so that it may begin its recirculating movement for further screening, sizing and crushing.

In devices now known to the art, it has been a difficult problem to return material from the conveyor 29 to the conveyor 13. Offset chutes and the like have been provided for this purpose, but it is quite apparent that one or the other or both of the conveyors 29 and 13 must be offset to permit material to be discharged onto the upper conveyor. Thus the machine is made considerably wider and it is frequently necessary to partly dismantle the machine and apparatus when moving it from one point to the other.

By utilizing the drum constructed according to my invention, material may be picked up from the lower conveyor 29 and conveyed to the upper conveyor without the necessity of offsetting one or the other of these conveyors. The space required is thus materially decreased and the efficiency of the crushing apparatus is improved.

The drum 41 is preferably supported by means of flanged rollers 51 and 52. The drum 41 is provided with annular angles 53 and 54 which stiffen the edges of the drum and serve as tracks to roll on the rollers 51 and 52. These rollers 51 and 52 are driven by means of shafts 56 and 57 which are in turn driven by means of bevel gearing 58 and 59. The bevel gears are driven by the cross shaft 61 and this cross shaft is in turn driven from any suitable source of power by the drive shaft 62 and bevel gear 65.

The drum 41 is preferably guided in its upright position by means of a frame 63 having inwardly projecting rollers 64 and 66. These rollers roll on the side walls of the flange members 53 and 54 and hold the drum in upright position.

In order to cut down on the length of the machine it may be desirable to position the hopper 16 forwardly of the rotary drum. If this is done, the conveyer can be shortened by terminating it at the rear side of said drum. Since machines of this type are rather long and sometimes difficult to move, because of their length, I have found that the shortening of this conveyer is of considerable advantage. Furthermore, with the use of my drum, I have eliminated the necessity for mounting the main conveyor at the side of the machine, and have, therefore, considerably reduced the width of the machine.

From the foregoing description, it will be seen that I have provided means for transferring, elevating and reversing the direction of the material treated, with an arrangement which has not only greatly reduced the number of working parts required but has also provided a much more compact arrangement. The apparatus is much more economical both in manufacture and operating cost, because of this reduction in the number of working parts used. It will further be seen that the baffles 47 can be easily replaced when they become worn and I prefer that the track members 53 and 54 be made removable so that they too may be quickly replaced after considerable wear.

While the drum device has been described in connection with a rock crushing machine, it is, of course, apparent that it may be utilized at any point where it is desirable to transfer material from one conveyer to another.

Although I have described a specific embodiment of my invention, it is apparent that the device may be modified. Such modifications may be made without departing from the spirit and scope of my invention as set forth in the appended claim.

I claim as my invention:

In a portable rock crusher, having a receiving hopper at its rear and toward its lower portion, a second hopper at its front and upper portion and an endless conveyor taking material from the first hopper to the second hopper, a vertical transfer wheel located between said hoppers and adjacent the rear hopper and encircling said endless conveyor, and means for delivering crusher aggregate thereto, said vertical transfer wheel operating to deposit such material on the endless conveyor after said conveyor has received material from the first named hopper.

STEPHEN JOHN MORRISSEY.